United States Patent [19]

Hartel

[11] Patent Number: 5,276,375
[45] Date of Patent: Jan. 4, 1994

[54] APPARATUS FOR FIXATION OF MAGNETIC SHELLS IN A MOTOR HOUSING

[75] Inventor: Gerd Hartel, Würzburg, Fed. Rep. of Germany

[73] Assignee: Siemens Aktiengesellschaft, Munich, Fed. Rep. of Germany

[21] Appl. No.: 980,022

[22] Filed: Nov. 23, 1992

[30] Foreign Application Priority Data

Nov. 29, 1991 [EP] European Pat. Off. ........ 91120522.7

[51] Int. Cl.$^5$ ............................................. H02K 21/26
[52] U.S. Cl. ........................................ 310/154; 310/89
[58] Field of Search ................. 310/154, 42, 89, 254, 310/256, 40; 29/596

[56] References Cited

U.S. PATENT DOCUMENTS

| | | |
|---|---|---|
| 4,914,713 | 4/1990 | Müller et al. ...................... 388/805 |
| 4,973,871 | 11/1990 | Bisantz ................................. 310/154 |
| 5,105,114 | 4/1992 | Sickle et al. ........................ 310/154 |

FOREIGN PATENT DOCUMENTS

| | | | |
|---|---|---|---|
| 0144004 | 6/1985 | European Pat. Off. ............ | 310/154 |
| 0154335 | 9/1985 | European Pat. Off. ............ | 310/154 |
| 2080419 | 11/1971 | France ................................ | 310/154 |

Primary Examiner—Steven L. Stephan
Assistant Examiner—Matthew Nguyen
Attorney, Agent, or Firm—Kenyon & Kenyon

[57] ABSTRACT

Fixation of magnetic shells may be implemented in a motor housing in a simple manner in terms of design and assembly technology while guaranteeing great heat resistance. S-shaped sheet metal stirrups include at least a first stirrup portion bent radially upwards, slit longitudinally, open on the end side and at least a second stirrup portion which is bent lower radially. The first stirrup portion laterally surrounds fixation cams which may be stamped out of the motor housing in a radially inward direction. The second stirrup portion passes below the fixation cam and rests against the end sides of the magnetic shells. The S-shaped sheet metal stirrups are axially inserted between tangentially opposite end sides of the magnetic shells to press down on them.

14 Claims, 3 Drawing Sheets

APPARATUS FOR FIXATION OF MAGNETIC SHELLS IN A MOTOR HOUSING

BACKGROUND OF THE INVENTION

The present invention relates to an arrangement for fixation of magnetic shells in a motor housing.

European Patent Document No. EP-B1-0 307 709 discloses an arrangement for fixation of two magnetic shells on the inside circumference of a motor housing in such a way that between the tangentially adjacent end sides of the magnetic shells, an insert spring is inserted, pressing the magnetic shells against the inside circumference. A solid plastic element presses against the end surfaces of the magnetic shells and is inserted axially between the two other adjacent end sides of the magnetic shells. The plastic element has an axial guide groove, opened towards its one axial front edge, to guide it axially and secure its tangential position with a positive lock, into which groove a corresponding guide cam, stamped radially inward into the motor housing, engages when the plastic element is pushed axially into the pole gap between the two end sides of the magnetic shells.

SUMMARY OF THE INVENTION

A simpler arrangement, in terms of design and assembly technology, can be achieved according to the present invention for fixation of magnetic shells in a motor housing, which arrangement is particularly heat stable at high motor operating temperatures. In the present invention, sheet metal stirrups are provided as the fixation or holder elements. The sheet metal stirrups include at least a first stirrup portion bent radially upwards, with a longitudinal slit, open on the end side and laterally surrounding the motor housing projection. The sheet metal stirrups additionally include at least a second stirrup portion which is bent lower radially and which passes below the motor housing projection and rests against the end sides of the magnetic shells.

A double-S-shaped sheet metal stirrup may be used as a fixation or holder part which is particularly stable in terms of position, and easy to insert into the pole gap between the adjacent end sides of two magnetic shells. Such a double-S-shaped sheet metal stirrup includes one slit first stirrup portion on each end side and in the middle. Second stirrup portions are included between the slit first stirrup portions. It is practical if the second stirrup portions remain unslit for further design simplification. A particularly good heat stability is obtained if the sheet metal stirrup is made of aluminum.

The arrangement according to the present invention makes it advantageously possible to achieve a securely guided fixation contact relative to the motor housing in spite of the fact that the light sheet metal stirrup is produced as a simple, one-piece punched and bent part. Additionally, the present invention achieves secure pressure against the end sides of the magnetic shells, which are provided with a phase on their radial outside edge which is disadvantageous for tangential fixation contact for production technology regions. Greater heat stability is guaranteed with the present invention in comparison with using a solid plastic element. Additionally, the present invention is less cost-intensive and uses a less tolerance-sensitive holder or fixation part in comparison with using a solid metal element, particularly a diecast element.

BRIEF DESCRIPTION OF THE DRAWINGS

The present invention is explained in greater detail in the following description on the basis of embodiments shown schematically in the attached drawings.

DETAILED DESCRIPTION

Figure 1:
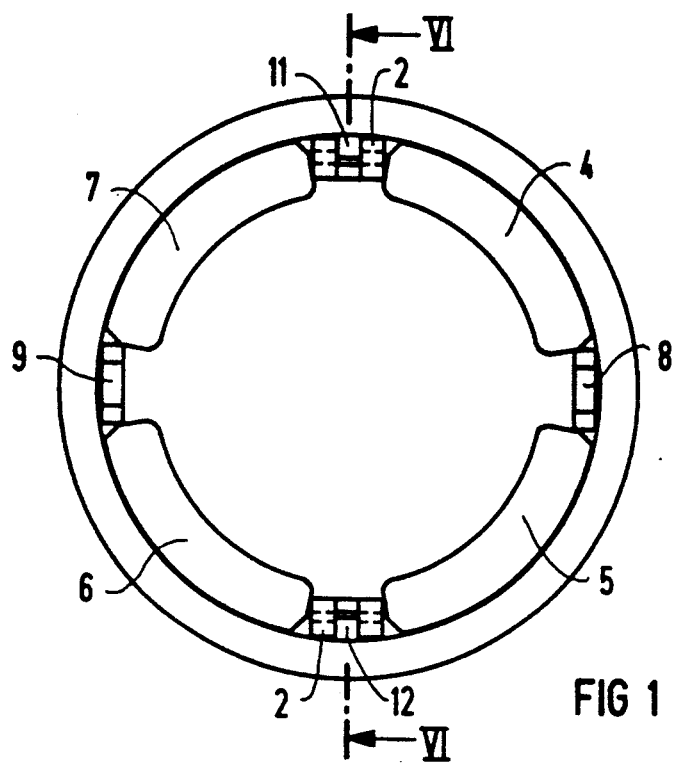
FIG. 1 illustrates a frontal top view of a pot-shaped motor housing with four magnetic shells fixed in place on its inside circumference.

FIG. 1 illustrates four magnetic shells 4, 5, 6, 7 arranged at a reciprocal tangential distance on the inside circumference of a pot-shaped motor housing 1 (see FIG. 6 and FIG. 7) of a commutator motor. Stirrup springs 8,9 are respectively arranged between the two sets of tangential end sides of the magnetic shells 4, 5 and 6, 7. Stirrup springs 8 and 9 press against the end sides and are pressed in axially in such a way that the other set of end sides of the magnetic shells are pressed against rigid sheet metal stirrups 2 or 3, respectively. Stirrup springs 8 and 9 can be fixed in place relative to the motor housing 1, at least in the circumferential direction of the motor housing 1, by means of radial fixation cams 11 and 12, respectively, which are radial motor housing projections stamped out of the housing.

Figure 2:
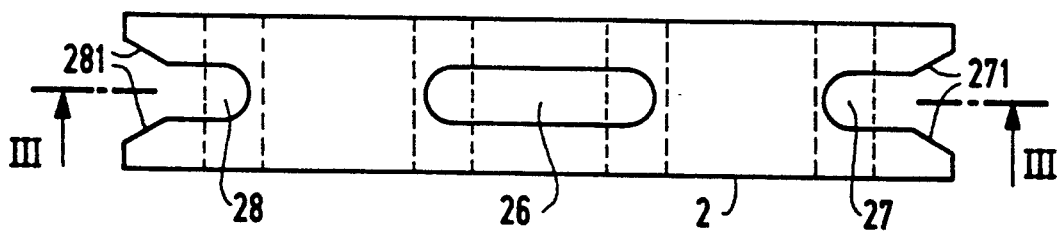
FIG. 2 illustrates a radial top view of a double-S-shaped sheet metal stirrup.
Figure 3:
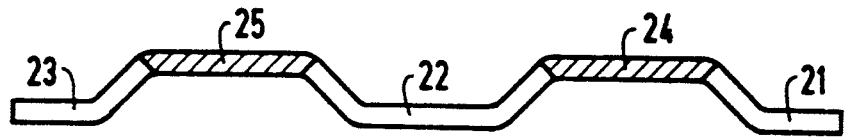
FIG. 3 illustrates the sheet metal stirrup pursuant to FIG. 2 along the sectional plane III—III.
Figure 5:
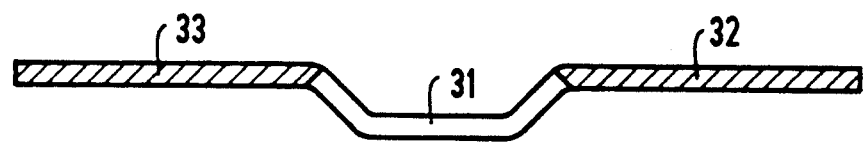
FIG. 5 illustrates the sheet metal stirrup pursuant to FIG. 4 along the sectional plane V—V.
Figure 6:
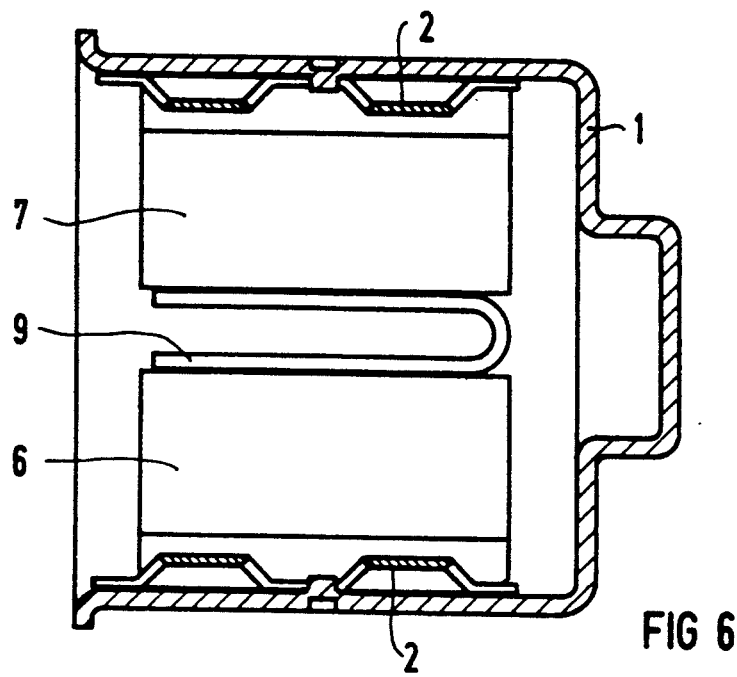
FIG. 6 illustrates an axial longitudinal cross-section through a motor housing with magnetic shells held in place by double-S-shaped sheet metal stirrups, along the sectional plane VI—VI in FIG. 1.
Figure 7:
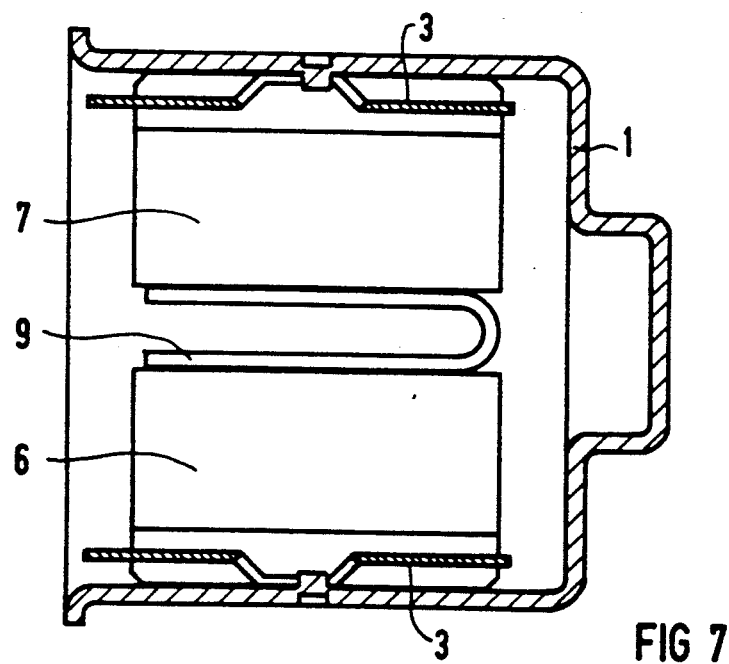
FIG. 7 illustrates an axial longitudinal cross-section through a motor housing with magnetic shells held in place with S-shaped sheet metal stirrups.

The sheet metal stirrups 2 and 3 may be formed, pursuant to advantageous developments of the present invention illustrated in FIGS. 2, 3, 6, as double-S-shaped sheet metal stirrups 2. Sheet metal stirrups 2 include one first stirrup portion 22, 23 or 21 which is longitudinally slit by end slits 27, 28 or a center slit 26, on each end side and in between, and second stirrup portions 24, 25 lying between them in each instance. Sheet metal stirrups 2 and 3 may also be formed pursuant to FIGS. 4, 5, 7, as simple S-shaped sheet metal stirrups 3 with a first stirrup portion 31 slit longitudinally by a center slit 34 which is axially centered, and two unslit second stirrup portions 32 and 33 axially on the ends.

With such a structure of the sheet metal stirrups 2 or 3, it is possible to insert the sheet metal stirrups into the pole gaps between the end sides of the magnetic shells 4, 5, 6, 7 in an axially guided manner laterally surrounding the fixation cams 11 or 12. This also guarantees secure contact against the end sides of the magnetic shells 4, 5, 6, 7 below their edge bevels.

When the sheet metal stirrups 2 or 3 are axially inserted into the pole gaps, the sheet metal stirrups are first guided by the fact that the fixation cams 11 or 12 engage in corresponding end-side end slits 27 or 28 of the sheet metal stirrup in the sense of a rail-like guide. When the stirrup is further axially inserted, the unslit second stirrup portions 24 or 25 slide radially below the fixation cams 11 or 12, and the fixation cams 11 or 12 engage with the center slit 26 of a centered, further first stirrup portion of the sheet metal stirrup 2 before the end operating position is reached. For simpler threading of the end slits 27 or 28 relative to the fixation cams 11 or 12 the end slits 27 and 28 are provided with funnel-shaped expansions 271 and 281, respectively.

Figure 4:
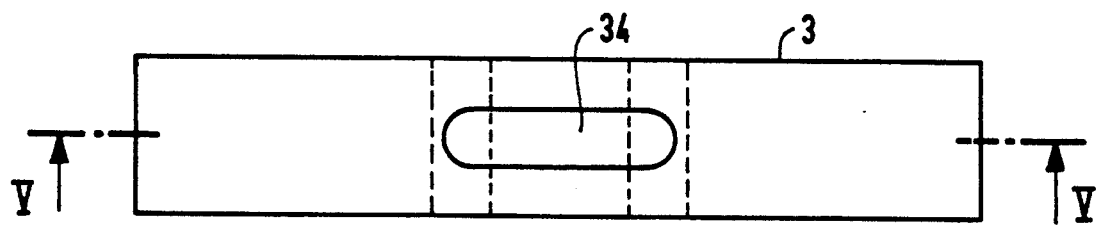
FIG. 4 illustrates a radial top view of an S-shaped sheet metal stirrup.

In a similar manner as described above on the basis of FIG. 2 and FIG. 3, guided fixation of the S-shaped sheet metal stirrup 3 of FIG. 4 and FIG. 5 relative to the motor housing 1 and secure end side contact against the magnetic shells 4, 5, 6, 7 takes place by means of a center slit 34 in the first stirrup portion 31. The second stirrup portions 32 and 33, which are bent lower, are unslit and can be axially inserted below the fixation cams 11, 12.

In advantageous manner, the sheet metal stirrups can thus be assembled in a very small space. They can also be positioned, on the one hand, guided by the slits which slide along the fixation cams, and fixed in place in their end operating position, at least in the circumferential direction of the motor housing, with a positive lock. On the other hand, they can be pressed against the large area end sides of the magnetic shells, which essentially run radially, without the danger of a large tolerance variation.

What is claimed is:

1. An apparatus for fixation of magnetic shells in a motor housing that has an inner circumferential portion, each of said magnetic shells having an outer circumferential portion facing the inner circumferential portion of said motor housing, said outer circumferential portion of said magnetic shells further terminating in side portions of said magnetic shells that face the side portions of adjacent magnetic shells, said apparatus comprising:

at least one motor housing projection on the inner circumferential portion of said motor housing; and a sheet metal stirrup inserted between and pressed against the side portions of adjacent magnetic shells, said sheet metal stirrup including:

a first stirrup portion bent radially toward the motor housing, slit along a longitudinal axis thereof and open on an side laterally surrounding said at least one motor housing projection; and a second stirrup portion which is bent radially away the motor housing and passes at a distance from the at least motor housing projection and rests against the side portions the magnetic shells.

2. An apparatus according to claim 1, wherein said sheet metal stirrup is an S-shaped sheet metal stirrup including a first stirrup portion slit axially in the center and two second stirrup portions axially at respective ends.

3. An apparatus according to claim 2, wherein said second stirrup portions are unslit.

4. An apparatus according to claim 1, wherein said sheet metal stirrup is a double-S-shaped sheet metal stirrup with a slit first stirrup portion on each of two end sides and in a middle portion, and a second stirrup portion lying on each side of the middle portion of the slit first stirrup portion between the middle portion and each slit first stirrup portion on the two end sides.

5. An apparatus according to claim 4, wherein said second stirrup portions are unslit.

6. An apparatus according to claim 1, wherein said sheet metal stirrup is in the form of a one-piece punched and bent part.

7. An apparatus according to claim 6, wherein said sheet metal stirrup is formed of aluminum sheet metal.

8. An apparatus according to claim 1, wherein said sheet metal stirrup is formed of aluminum sheet metal.

9. An apparatus according to claim 1, wherein the first stirrup portion of said sheet metal stirrup rests against an inside circumferential surface of the motor housing.

10. An apparatus according to claim 2, wherein the first stirrup portion of said sheet metal stirrup rests against an inside circumferential surface of the motor housing.

11. An apparatus according to claim 1, said longitudinal slits of said first stirrup portion further comprising end-side funnel-shaped insertion expansions for at least one of the at least one motor housing projection.

12. An apparatus according to claim 1, wherein said at least one motor housing projection comprises fixation cams stamped radially inward out of the motor housing.

13. An apparatus according to claim 4, wherein the first stirrup portion of said sheet metal stirrup rests against an inside circumferential surface of the motor housing.

14. An apparatus according to claim 6, wherein the first stirrup portion of said sheet metal stirrup rests against an inside circumferential surface of the motor housing.

* * * * *